US006806462B1

(12) United States Patent
Polyakov et al.

(10) Patent No.: US 6,806,462 B1
(45) Date of Patent: Oct. 19, 2004

(54) METHOD OF SEPARATION OF PALLADIUM ISOTOPES IN ELECTROMAGNETIC SEPARATOR USING A SOURCE OF IONS

(75) Inventors: Leonid Alexeevich Polyakov, Lesnoi (RU); Alexei Nikolaevich Tatarinov, Lesnoi (RU); Jury Alexandrovich Monastyrev, Lesnoi (RU); Sergei Georgievich Ogorodnikov, Lesnoi (RU)

(73) Assignee: Kombinat "Elektrokhimpribor", Lesnoi (RU)

( * ) Notice: Subject to any disclaimer, the term of this patent is extended or adjusted under 35 U.S.C. 154(b) by 214 days.

(21) Appl. No.: 09/667,282

(22) Filed: Sep. 22, 2000

(30) Foreign Application Priority Data

Nov. 29, 1999 (RU) .......................................... 99125195

(51) Int. Cl.⁷ ............................ B01D 59/44; H01J 49/00
(52) U.S. Cl. ........................ 250/282; 250/283; 250/281
(58) Field of Search ................................ 250/281, 282, 250/283, 252, 304, 423; 422/186

(56) References Cited

U.S. PATENT DOCUMENTS

| 4,167,668 A |   | 9/1979  | Mourier ..................... 250/291 |
| 4,377,745 A |   | 3/1983  | Chang ........................ 250/283 |
| 4,704,197 A | * | 11/1987 | Trajmar ................. 204/157.22 |
| 5,110,562 A | * | 5/1992  | Sasao et al. ................ 422/186 |

OTHER PUBLICATIONS

Kascheev, N.A., et al., *Electro–Magnetic Separation of Isotopes and Isotopic Analysis*, Energoatomizdat Moscow, 1989 in Russian with English translation selected portions.
Newman, E. et al. "Some New Techniques and Recent Developments in Isotope Separations at Oak Ridge" *Nuclear Instruments and Methods* vol. 139 (1976) pp. 87–93.
Kascheev, N.A. et al. "Electromagnetic Separation of Isotopes and Isoptic Analysis" Moscow, *Energoatomizdat* (1989).
Botchin, V.P. et al. "Electromagnetic Separation of Isotopes of Platinum–Palladium Group" *Isotopenpraxis* Helf 6 (1971).

* cited by examiner

*Primary Examiner*—John R. Lee
*Assistant Examiner*—Erin-Michael Gill
(74) *Attorney, Agent, or Firm*—Ladas & Parry

(57) ABSTRACT

A method of electromagnetic separation of palladium isotopes places working substance of metal palladium in a gas-discharge chamber crucible with a source of ions. The working substance is heated to vapors, the vapors of the working substance ionized in the gas-discharge chamber under the action of electron emission from a hot cathode, and ionic beams formed by electrodes of an ion-optical system. The ionic beams separate isotopes in a magnetic field, entrapping the ions in receiving boxes, the temperature of the gas-discharge chamber being maintained within 1500–1700° C. The method is effectively used for separation of isotopes Pd-102, Pd-104, Pd-105, Pd-106, Pd-108 b Pd-110 with a high enrichment degree.

5 Claims, 1 Drawing Sheet

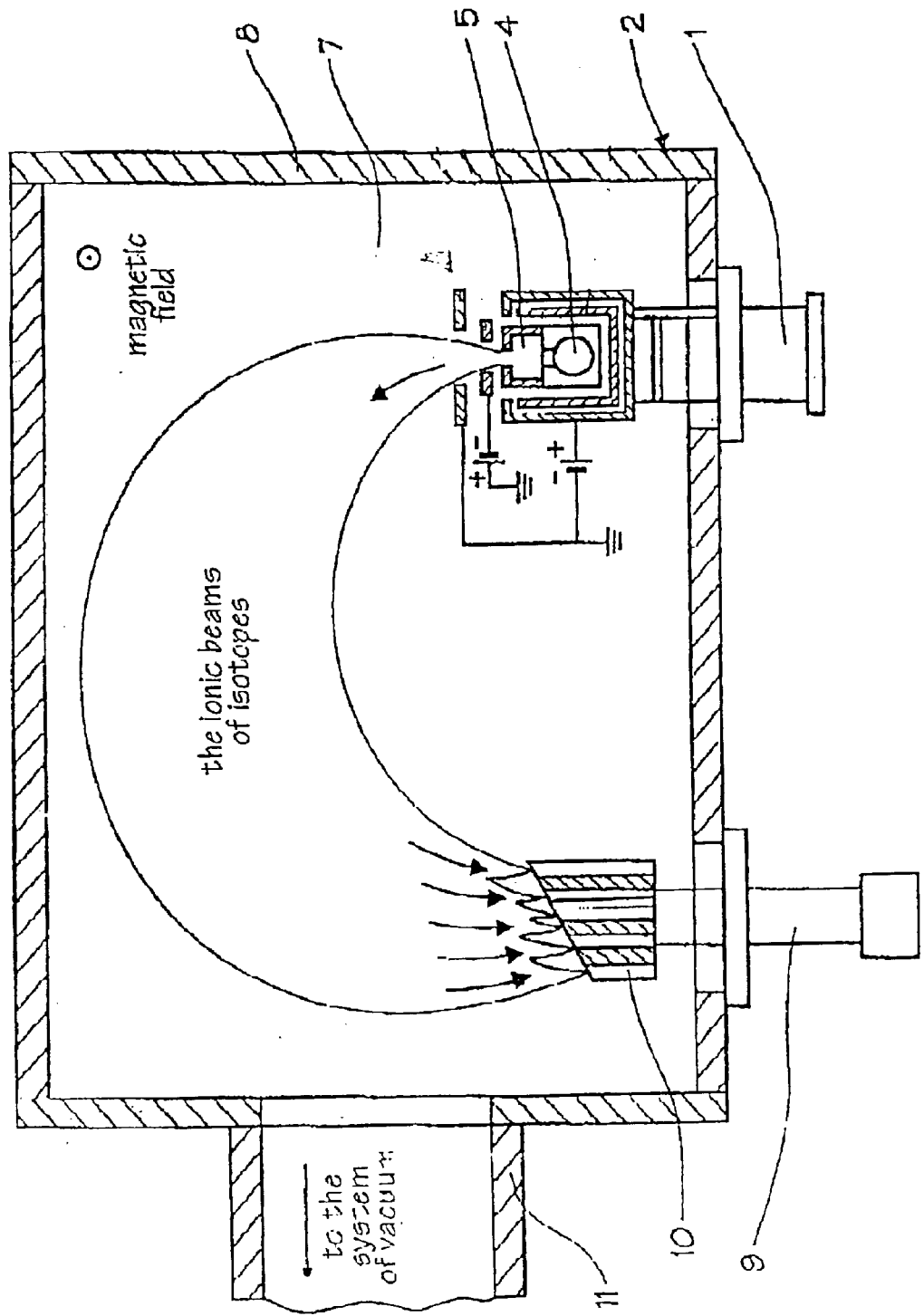

METHOD OF SEPARATION OF PALLADIUM ISOTOPES IN ELECTROMAGNETIC SEPARATOR USING A SOURCE OF IONS

FIELD OF THE INVENTION

The present invention relates to the technology of electromagnetic separation of isotopes of chemical elements and, particularly, to electromagnetic separation of palladium isotopes palladium-102, palladium-104, palladium-105, palladium-106, palladium-108, and palladium-110.

BACKGROUND OF THE INVENTION

A known method of separation of isotopes heats chemical elements in a crucible of a gas-discharge chamber by thermal radiation of active resistance heaters to ionization of molecules in the gas-discharge chamber. The ions are formed into an ionic beam that is separated and focused by a magnetic field according to the mass of the ion isotopes and entrapped by receiving boxes. See, N. A. Kascheev, V. A. Dergatchev. "Electromagnetic separation of isotopes and isotopic analysis". Moscow, "Energoatomizdat", 1989.

Deficiency of the stated method is in that it has low efficiency of separation of the elements of platinum-palladium group.

The method described by V. P. Botchin, B. E. Gavrilov and V. S. Zolotariov in "Isotopenpraxis" Heft 6 (1971) 232 consists in the following. Vapors are formed during heating at temperatures up to 1000° C. in a crucible from a reaction of metal powder palladium and fluorine gas fed into the crucible through an in-leakage system. Ions are formed in the vapors by action of electron emission of a hot cathode and formed into an ionic beam by electrodes of an ion-optical system. In the process of being pumped out through a separating chamber the ionic beams of palladium isotopes are separated in a static magnetic field depending on mass of isotopes (Pd-102, Pd-104, Pd-105, Pd-106, Pd-108 and Pd-110), focused by this field and entrapped by receiving boxes.

A drawback of the known method of palladium isotope separation in such electromagnetic separators is low enrichment of entrapped isotopes due to dispersion of the isotope ion beams on molecules of the residual gas, mainly fluorine, not reacted with metal palladium. Besides, presence of an additional parameter—pressure of fluorine—in the source crucible and in the separating chamber considerably complicates selection of focusing modes.

Other deficiencies of the known method are the following:
necessity to use special constructional materials being corrosion-resistant to action of fluorine;
special safety measures of protection which is a complicated problem in conditions of industrial manufacture.

SUMMARY OF THE INVENTION

The object of the present invention is in increasing the enrichment of separated palladium isotopes.

The stated object is achieved by using metal palladium as the working substance. This working substance is not hygroscopic, feebly reacts with constructional materials and creates pressure vapors sufficient for maintaining a steady arc discharge in the temperature span from 1500 to 1700° C. The use of metal palladium (in the form of powder, sponge, ingot etc.) as the working substance provides good focusing of ionic beams in manufacturing conditions and increases enrichment of separated palladium isotopes.

A method of electromagnetic separation of palladium isotopes places a working substance of metal palladium in a gas-discharge chamber crucible with a source of ions. The working substance is heated to vapors, the vapors of the working substance ionized in the gas-discharge chamber under the action of electron emission from a hot cathode, and ionic beams formed by electrodes of an ion-optical system. The ionic beams separate the isotopes in a magnetic field, entrapping the ions in receiving boxes, the temperature of the gas-discharge chamber being maintained within 1500–1700° C. The method is effectively used for separation of isotopes Pd-102, Pd-104, Pd105, Pd-106, Pd-108 b Pd-110 with a high enrichment degree.

BRIEF DESCRIPTION OF THE DRAWING

The drawing shows a schematic elevation, partly in section, of an exemplary embodiment.

DESCRIPTION OF EXEMPLARY EMBODIMENT

An exemplary embodiment of the method of palladium isotope separation in an electromagnetic separator with use of a source of ions is presented below for explanation of the invention. One of separating chambers (at 2 in the FIGURE) of the industrial electromagnetic separator "SU-20"—production of the industrial complex "Electrohimpribor", Russia—was used for the experiment. A weighed portion of spongy metal palladium was placed in a graphite crucible 4 combined with a gas-discharge chamber 5 of an ion source 1. After installation of the source and a six-boxes receiver 10 in the inside 7 of the walls 8 of the separating chamber at 2 the separating chamber was pumped-out by vacuum pumps through an outlet 11 up to the pressure $(1–2)\cdot 10^{-3}$ Pa and the source was high-voltage trained of up to voltage 33–35 kV.

To obtain an electron beam in the gas-discharge chamber of the source the cathode block—was applied voltages ensuring: filament current −70–80 A, voltage between filament and hot cathode −0.8–1.0 kV, emission current −0.5–0.6 A. At current of arc discharge 0.5–1.5 A and voltage of discharge 150–350 V ionization was carried out of the vapors of working substance formed at power of crucible heater of 2500–4000 W.

Formed palladium ions were drawn out through a slot of the gas-discharge chamber with help of an ion-optical system and were shaped in an ionic beam which under action of accelerating voltage and static magnetic field of 2600 Oersted in the chamber was separated on six :ionic beams of isotopes according to masses of the ions. These beams of isotopes were focused by the illustrated magnetic field in a focal plane where inlets of the receiver boxes 10 of a receiver 9 were positioned.

After accumulation the receivers were taken out from the separating chamber, isotopes were removed by the method of anodic pickling from the boxes, obtained isotopic enriched solution was analyzed on enrichment and processed to the finished product.

Following isotopes were obtained in the process of experimental-industrial separation on electromagnetic separator "SU-20":

isotope Pd-102 with enrichment 85.4–92.9%—3 g;
isotope Pd-104 with enrichment 96.6–98.4%—34 g;
isotope-Pd-105 with enrichment 98.4–99.1%—65 g;
isotope Pd-106 with enrichment 99.1–99.5%—a–82 g;
isotope Pd-108 with enrichment 99.4–99.6%—86 g;
isotope Pd-110 with enrichment 99.2–99.5%—35 g;

The table represents basic parameters of the method of palladium isotope separation according to the claimed technical solution.

TABLE

| No. | Basic parameters | Clamed technical solution |
|---|---|---|
| 1. | Source | without inleakage system |
| 2. | Working substance | metal Pd |
| 3. | Arc discharge current, A | 0.5–1.5 |
| 4. | Arc discharge voltage, V | 150–350 |
| 5. | Power of crucible heater, W | 2500–4000 |
| 6. | Pressure in the separating chamber, Pa | $(1-2) \cdot 10^{-3}$ |
| 7. | Pd load in crucible, g | 15–20 |
| 8. | Mean operating time of the source, hours | 25–30 |
| 9. | Ionic current on the receiver, mA | 15–25 |

The proposed method of palladium isotope separation compared with the existing methods showed high performance effective for industrial electromagnetic palladium isotope separation and deriving of isotopes: Pd-102, Pd104, Pd-105, Pd-106, Pd-108 and Pd-110 with a higher level of enrichment. Elimination of the fluorination process also permitted abandonment of complex security measures for work with gaseous fluorine, which improves the working conditions of the personnel.

What is claimed is:

1. In a method of separating palladium isotopes in an electromagnetic separator having a source of ions, the improvements comprising:

placing of a working substance in a combined gas-discharge chamber/graphite crucible;

heating the working substance into a vapor;

ionizing the vapors with electron emission from a hot cathode;

forming the ionized vapors into an ionic beam with electrodes of an ion-optical system;

separating and focusing the ionic beam according to isotopes with a magnetic field, and entrapping the isotopes in receiving boxes, wherein the working substance is metallic palladium and temperatures of the heating are 1580–1700° C.

2. In a method using ion beams of a material in a magnetic field for separating isotopes of at least a constituent of the material, the improvement wherein the material is metallic palladium, and wherein the metallic palladium is obtained in a vapor by heating metallic palladium to 1580–1700 degrees Centigrade.

3. The method according to claim 2, wherein in the heating of a metallic does not form a reaction product.

4. In a method using ion beams of a material in a magnetic field for separating isotopes of at least a constituent of the material, the improvement wherein the material consists essentially of metallic palladium, and wherein the metallic palladium is obtained in a vapor by heating metallic palladium to 1580–1700 degrees Centigrade.

5. The method according to claim 4, wherein the heating of the metallic palladium does not form a reaction product.

* * * * *